US00RE36902E

United States Patent [19]

Eckel et al.

[11] E Patent Number: Re. 36,902

[45] Reissued Date of Patent: Oct. 3, 2000

[54] FLAME RESISTANT POLYCARBONATE/ABS MOULDING COMPOUNDS RESISTANT TO STRESS CRACKING

[75] Inventors: Thomas Eckel, Dormagen; Dieter Wittmann, Leverkusen; Manfred Öller, Krefeld; Heinrich Alberts, Odenthal, all of Germany

[73] Assignee: Bayer AG, Leverkusen, Germany

[21] Appl. No.: 09/405,635

[22] Filed: Sep. 27, 1999

Related U.S. Patent Documents

Reissue of:

[64] Patent No.: 5,672,645
Issued: Sep. 30, 1997
Appl. No.: 08/764,747
Filed: Dec. 12, 1996

U.S. Applications:

[63] Continuation of application No. 08/516,899, Aug. 18, 1995, abandoned, which is a continuation of application No. 08/290,544, Aug. 15, 1994, abandoned.

[30] Foreign Application Priority Data

Aug. 26, 1993 [DE] Germany ..... 43 28 656

[51] Int. Cl.[7] ..... C08K 5/523

[52] U.S. Cl. ..... 524/127; 524/145

[58] Field of Search ..... 524/145, 127

[56] References Cited

U.S. PATENT DOCUMENTS

| | | |
|---|---|---|
| 4,914,144 | 4/1990 | Muehlbach et al. . |
| 4,983,658 | 1/1991 | Kress . |
| 5,030,675 | 7/1991 | Wittmann et al. . |
| 5,036,126 | 7/1991 | Rinehart et al. . |
| 5,061,745 | 10/1991 | Wittmann et al. . |
| 5,122,556 | 6/1992 | Kambour . |
| 5,157,065 | 10/1992 | Fuhr et al. . |
| 5,204,394 | 4/1993 | Gosens et al. . |
| 5,272,193 | 12/1993 | Fuhr et al. . |
| 5,276,078 | 1/1994 | Ogoe et al. . |
| 5,290,836 | 3/1994 | Truyen . |
| 5,292,786 | 3/1994 | Gaggar et al. . |
| 5,302,646 | 4/1994 | Vilasagar et al. . |

FOREIGN PATENT DOCUMENTS

| | | |
|---|---|---|
| 521 745 | of 0000 | European Pat. Off. . |
| 174 493 | 3/1986 | European Pat. Off. . |
| 363 608 | 4/1990 | European Pat. Off. . |
| 491 986 | 7/1992 | European Pat. Off. . |
| 594 021 | 4/1994 | European Pat. Off. . |
| 521 628 | 3/1996 | European Pat. Off. . |
| 59-024736 | 2/1984 | Japan . |
| 59-045351 | 3/1984 | Japan . |

OTHER PUBLICATIONS

Abstract of JA 59 202 240, cited in Polymer and General Chemistry, p. 2.

*Primary Examiner*—Veronica P. Hoke
*Attorney, Agent, or Firm*—Connolly Bove Lodge & Hutz LLP

[57] ABSTRACT

Flame resistant, thermoplastic molding compounds containing

A) 40 to 98 parts by weight of an aromatic polycarbonate,

B) 3 to 50 parts by weight of a vinyl copolymer,

C) 0.5 to 40 parts by weight of a graft polymer,

D) 0.5 to 20 parts by weight of a mixture of

D.1) 10 to 90 wt. %, related to D) , of a monophosphorus compound of the formula (I)

(I)

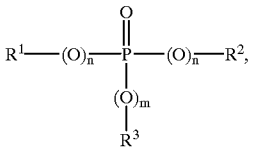

D.2) 90 to 10 wt. %, related to D), of an oligomeric phosphorus compound of the formula (II)

(II)

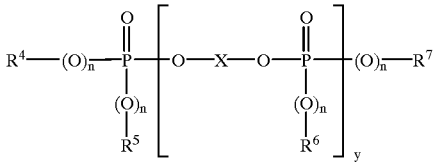

and

E) 0.05 to 5 parts by weight of a fluorinated polyolefin with an average particle diameter of 0.05 to 1000 $\mu$m, a density of 1.2 to 2.3 g/cm$^3$ and a fluorine content of 65 to 76 wt. %.

13 Claims, No Drawings

FLAME RESISTANT POLYCARBONATE/ABS MOULDING COMPOUNDS RESISTANT TO STRESS CRACKING

Matter enclosed in heavy brackets [ ] appears in the original patent but forms no part of this reissue specification; matter printed in italics indicates the additions made by reissue.

This application is a continuation of application Ser. No. 08/516,899 filed on Aug. 18, 1995 now abandoned, which in turn is a continuation of Ser. No. 08/290,544, filed on Aug. 15, 1994 now abandoned.

The present invention relates to flame resistant polycarbonate/ABS moulding compounds whose stress cracking resistance is substantially improved by a combination of additives comprising a monophosphorus compound and an oligomeric phosphorus compound.

EP-A 0 174 493 (U.S. Pat. No. 4,983,658) describes flameproofed polymer blends containing halogen prepared from an aromatic polycarbonate, a graft copolymer containing styrene, monophosphates and a special polytetrafluoroethylene formulation. While these blends do indeed have adequate fire behaviour and mechanical properties, they may be deficient in stress cracking resistance.

U.S. Pat. No. 5,030,675 describes flame resistant, thermoplastic moulding compounds prepared from an aromatic polycarbonate, ABS polymer, polyalkylene terephthalate together with monophosphates and fluorinated polyolefins as flame retardants. Good stress cracking resistance is accompanied by deficiencies in notched impact strength, together with unsatisfactory thermal stability when exposed to elevated temperatures, such as for example during processing.

Diphosphates are known as flame retardants. JA 59 202 240 describes the production of such a product from phosphorus oxychloride, diphenols such as hydroquinone or bisphenol A and monophenols such as phenol or cresol. These diphosphates may be used as flame retardants in polyamide or polycarbonate. However, this publication contains no indication of any improvement in stress cracking resistance by adding the oligomeric phosphate to polycarbonate moulding compounds in conjunction with polyalkylene terephthalates. EP-A 0 363 608 (=U.S. Pat. No. 5,204,394) describes polymer blends prepared from an aromatic polycarbonate, a Copolymer or graft copolymer containing styrene, together with oligomeric phosphates as flame retardants. U.S. Pat. No. 5,061,745 describes polymer blends prepared from an aromatic polycarbonate, ABS graft copolymer and/or a copolymer containing styrene and monophosphates as flame retardants. The stress cracking resistance of these blends is often inadequate for the production of thin-walled casing components.

It has surprisingly now been found that flame resistant polycarbonate/ABS moulding compounds with excellent stress cracking resistance may be produced if a combination of additives comprising a monophosphorus compound and an oligomeric phosphorus compound is added. Particularly elevated stress cracking resistance is achieved if the ratio by weight of the monophosphorus compound to the oligomeric phosphorus compound is within the range 90:10 to 10:90. These moulding compounds are particularly suitable for the production of thin-walled mouldings (computer equipment casing parts), where elevated processing temperatures and pressures result in the exposure of the material used to considerable stress.

The present invention provides flame resistant, thermoplastic moulding compounds prepared from A) 40 to 98 parts by weight, preferably 50 to 95 parts by weight, particularly preferably 60 to 90 parts by weight of an aromatic polycarbonate, B) 3 to 50, preferably 5 to 40 parts by weight of a vinyl copolymer prepared from B.1) 50 to 98, preferably 60 to 95 parts by weight of styrene, α-methylstyrene, ring-substituted styrenes, $C_1$–$C_8$ alkyl methacrylates, $C_1$–$C_8$ alkyl acrylates or mixtures thereof and B.2) 50 to 2, preferably 40 to 5 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof, C) 0.5 to 40 parts by weight, preferably 1 to 20 parts by weight, particularly preferably 2 to 12 parts by weight of a graft polymer, D) 0.5 to 20 parts by weight, preferably 1 to 18 parts by weight, particularly preferably 2 to 15 parts by weight of a mixture of D.1) 10 to 90 wt. %, preferably 12 to 50, in particular 14 to 40 wt. %, very particular 15 to 40 wt. % (related to the total quantity of D) of a monophosphorus compound of the formula (I)

(I)

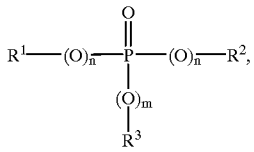

in which $R^1$, $R^2$ and $R^3$ mutually independently mean optionally halogenated $C_1$–$C_8$ alkyl, $C_6$–$C_{20}$ aryl or $C_7$–$C_{12}$ aralkyl m means 0 or 1 and n means 0 or 1 and D.2) 90 to 10 wt. %, preferably 88 to 50, in particular 86 to 60 wt. %, very particular 85 to 60 wt. % (related to the total amount of D) of an oligomeric phosphorus compound of the formula (II)

(II)

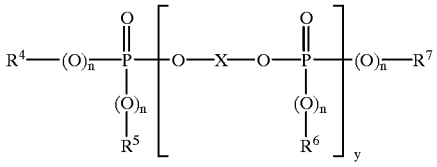

in which $R^4$, $R^5$, $R^6$, $R^7$ mutually independently mean $C_1$–$C_8$ alkyl, $C_5$–$C_6$ cycloalkyl, $C_6$–$C_{10}$ aryl or $C_7$–$C_{12}$ aralkyl, n mutually independently mean 0 or 1, y means 1 to 5 and X means a mono- or polycyclic aromatic residue with 6 to 30 C atoms, and E) 0.05 to 5 parts by weight, preferably 0.1 to 1 part by weight, particularly preferably 0.1 to 0.5 parts by weight of a fluorinated polyolefin with an average particle diameter of 0.05 to 1000 μm, a density of 1.2 to 2.3 g/cm$^3$ and a fluorine content of 65 to 76 wt. %.

The sum of all the parts by weight A+B+C+D+E is 100.

COMPONENT A

Suitable component A thermoplastic, aromatic polycarbonates according to the invention are those based on diphenols of the formula (III)

(III)

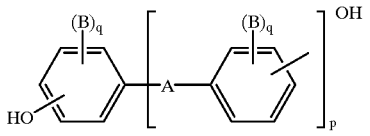

in which

A is a single bond, $C_1$–$C_5$ alkylene, $C_2$–$C_5$ alkylidene, $C_5$–$C_6$ cycloalkylidene, —S— or —$SO_2$—, B is chlorine, bromine, q is 0, 1 or 2 and p is 1 or 0 or alkyl-substituted dihydroxyphenylcycloalkanes of the formula (IV), (IV)

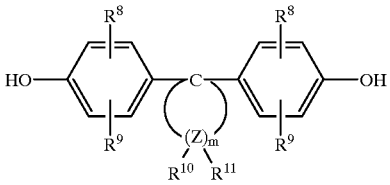

in which $R^8$ and $R^9$ mutually independently mean hydrogen, halogen, preferably chlorine or bromine, $C_1$–$C_8$ alkyl, $C_5$–$C_6$ cycloalkyl, $C_6$–$C_{10}$ aryl, preferably phenyl, and $C_7$–$C_{12}$ aralkyl, preferably phenyl-$C_1$–$C_4$-alkyl, in particular benzyl, m means an integer of 4, 5, 6 or 7, preferably 4 or 5, $R^{10}$ and $R^{11}$ mean, individually selectable for each Z, and mutually independently hydrogen or $C_1$–$C_6$ alkyl and Z means carbon, provided that on at least one Z atom, $R^{10}$ and $R^{11}$ simultaneously mean alkyl.

Suitable diphenols of the formula (III) are, for example, hydroquinone, resorcinol, 4,4'-dihydroxydiphenyl, 2,2-bis-(4-hydroxyphenyl) propane, 2,4-bis-(4-hydroxyphenyl)-2-methylbutane, 1,1-bis-(4-hydroxyphenyl)-cyclohexane, 2,2-bis-(3-chloro-4-hydroxyphenyl) propane, 2,2-bis -(3,5-dibromo-4-hydroxyphenyl)propane.

Preferred diphenols of the formula (III) are 2,2bis-(4-hydroxyphenyl)propane, 2,2-bis-(3,5-dichloro-4-hydroxyphenyl)propane and 1,1-bis-(4-hydroxyphenyl) cyclohexane.

Preferred diphenols of the formula (IV) are 1,1-bis-(4-hydroxyphenyl)-3,3-dimethylcyclohexane, 1,1-bis-(4-hydroxyphenyl)-3,3,5-trimethylcyclohexane and 1,1-bis-(4-hydroxyphenyl)-2,4,4-trimethylcyclopentane.

Both homopolycarbonates and copolycarbonates are suitable polycarbonates according to the invention.

Component A may also be a blend of the thermoplastic polycarbonates specified above.

Polycarbonates may be produced in a known manner from diphenols with phosgene using the phase interface process or with phosgene using the homogeneous phase process, the so-called pyridine process, wherein molecular weight may be adjusted in a known manner with an appropriate quantity of known chain terminators.

Suitable chain terminators are, for example, not only phenol, p-chlorophenol, p-tert.-butylphenol or 2,4,6-tribromophenol, but also long-chain alkylphenols such as 4-(1,3-tetramethylbutyl)phenol according to DE-OS 2 842 005 (Le A 19 006) or monoalkylphenol or dialkylphenol with a total of 8 to 20 C atoms in the alkyl substituents according to German patent application P 3 506 472.2 (Le A 23 654), such as 3,5-di-tert.-butylphenol, p-iso-octylphenol, p-tert.-octylphenol, p-dodecylphenol and 2-(3,5-dimethylheptyl)phenol and 4-(3,5-dimethylheptyl)phenol.

The quantity of chain terminators is in general between 0.5 and 10 mol. %, related to the sum of the diphenols of the formulae (III) and/or (IV) used in each case.

Suitable polycarbonates A according to the invention have average molecular weights ($\overline{M}_w$, weight average measured for example by ultracentrifugation or light scattering) of 10,000 to 200,000, preferably of 20,000 to 80,000.

Suitable polycarbonates A according to the invention may be branched in a known manner, in particular preferably by incorporation 0.05 to 2 mol. %, related to total quantity of diphenols used, of tri- or higher functional compounds, for example those with three or more phenolic groups.

In addition to bisphenol A homopolycarbonate, preferred polycarbonates are copolycarbonates of bisphenol A with up to 15 mol. %, related to the total molar quantities of diphenols, of 2,2-bis-(3,5-dibromo-4-hydroxylphenyl) propane and the copolycarbonates of bisphenol A with up to 60 mol. %, related to the total molar quantities of diphenols, of 1,1-bis-(4-hydroxyphenyl)-3,3,5-trimethyl-cyclohexane.

The polycarbonates A may be partially or entirely replaced with aromatic polyester-carbonates.

COMPONENT B

Component B vinyl copolymers which may be used according to the invention are those prepared from at least one monomer of the group: styrene, α-methylstyrene and/or ring-substituted styrenes, $C_1$–$C_8$ alkyl methacrylate, $C_1$–$C_8$ alkyl acrylate (B.1) with at least one monomer from the group: acrylonitrile, methacrylonitrile, $C_1$–$C_8$ alkyl methacrylate, $C_1$–$C_8$ alkyl acrylate, maleic anhydride and/or N-substituted maleimide (B.2).

$C_1$–$C_8$ alkyl acrylates or $C_1$–$C_8$ alkyl methacrylates are esters of acrylic or methacrylic acids respectively with monohydric alcohols with 1 to 8 C atoms. Methyl methacrylate, ethyl methacrylate and propyl methacrylate are particularly preferred. Methyl methacrylate is cited as a particularly preferred methacrylic acid ester. Thermoplastic copolymers of a composition according to component B may be produced as secondary products of graft polymerisation during production of component C, particularly if large quantities of monomers are grafted onto small quantities of rubber. The quantity of copolymer B to be used according to the invention does not include these secondary products of graft polymerisation.

The component B copolymers are resinous, thermoplastic and contain no rubber.

The thermoplastic copolymers B contain 50 to 98, preferably 60 to 95 parts by weight of B.1 and 50 to 2, preferably 40 to 5 parts by weight of B.2.

Particularly preferred copolymers B are those prepared from styrene with acrylonitrile and optionally methyl methacrylate, from α-methylstyrene with acrylonitrile and optionally methyl methacrylate or from styrene and α-methylstyrene with acrylonitrile and optionally methyl methacrylate.

The component B styrene/acrylonitrile copolymers are known any may be produced by free-radical polymerisation, in particular by emulsion, suspension, solution or bulk polymerisation. The component B copolymers preferably have molecular weights $\overline{M}_w$ (weight average, determined by light scattering or setting) of between 15,000 and 200,000.

Particularly preferred copolymers B according to the invention are also random copolymers of styrene and maleic anhydride, which may be produced from the corresponding monomers by continuous bulk or solution polymerisation with incomplete conversion.

The proportions of the two components in the suitable random styrene-maleic anhydride copolymers according to the invention may be varied within a wide range. The preferred maleic anhydride content is between 5 and 25 wt. %.

The molecular weights (number average, $\overline{M}_n$) of the suitable component B random styrene/maleic anhydride copolymers according to the invention may vary over a wide range. A range of 60,000 to 200,000 is preferred. An intrinsic viscosity of 0.3 to 0.9 is preferred for these products (measured in dimethylformamide at 25° C.; see Hoffmann, Krömer, Kuhn, *Polymeranalytik I,* Stuttgart 1977, p. 316 et seq.).

Instead of styrene, the vinyl copolymers B may also contain ring-substituted styrenes such as p-methylstyrene, vinyltoluene, 2,4-dimethylstyrene, and other substituted styrenes such as α-methylstyrene.

COMPONENT C

The graft polymers C) comprise, for example, graft copolymers with rubber-elastic properties, which are substantially obtainable from at least two of the following monomers: chloroprene, 1,3-butadiene, isoprene, styrene, acrylonitrile, ethylene, propylene, vinyl acetate and (meth) acrylic acid esters with 1 to 18 C atoms in the alcohol component; i.e. polymers as are, for example, described in *Methoden der Organischen Chemie* (Houben-Weyl), vol. 14/1, Georg Thieme Verlag, Stuttgart 1961, p. 393–406 and in C. B. Bucknall, *Toughened Plastics,* Appl. Science Publishers, London 1977. Preferred polymers C) are partially crosslinked and have a gel content of above 20 wt. %, preferably of above 40 wt. %, in particular above 60 wt. %.

Preferred graft polymers C) comprise graft copolymers prepared from:

C.1) 5 to 95, preferably 30 to 80 parts by weight of a mixture of

C.1.1) 50 to 95 parts by weight of styrene, α-methylstyrene, halogen or methyl ring-substituted styrene, $C_1$–$C_8$ alkyl methacrylate, in particular methyl methacrylate, $C_1$–$C_8$ alkyl acrylate, in particular methyl acrylate, or mixtures of these compounds and C.1.2) 5 to 50 parts by weight of acrylonitrile, methacrylonitrile, $C_1$–$C_8$ alkyl methacrylates, in particular methyl methacrylate, $C_1$–$C_8$ alkyl acrylate, in particular methyl acrylate, maleic anhydride, $C_1$–$C_4$ alkyl or phenyl N-substituted maleimides or mixtures of these compounds on C.2) 5 to 95, preferably 20 to 70 parts by weight of a polymer with a glass transition temperature of below −10° C.

Preferred graft polymers C) are, for example, polybutadienes, butadiene/styrene copolymers and acrylate rubbers grafted with styrene and/or acrylonitrile and/or (meth)acrylic acid alkyl esters; i.e. copolymers of the type described in DE-OS 1 694 173 (=U.S. Pat. No. 3,564,077); polybutadienes, butadiene/styrene or butadiene/ acrylonitrile copolymers, polyisobutenes or polyisoprenes grafted with acrylic or methacrylic acid alkyl esters, vinyl acetate, acrylonitrile, styrene and/or alkylstyrenes, as are, for example, described in DE-OS 2 348 377 (=U.S. Pat. No. 3,919,353).

Particularly preferred polymers C) are, for example, ABS polymers, as are for example described in DE-OS 2 035 390 (=U.S. Pat. No. 3,644,574) or in DE-OS 2 248 242 (GB patent 1,409,275).

Particularly preferred graft polymers C) are graft polymers obtainable by the grafting reaction of I. 10 to 70, preferably 15 to 50, in particular 20 to 40 wt. %, related to the grafted product, of at least one (meth) acrylic acid ester of 10 to 70, preferably 15 to 50, in particular 20 to 40 wt. % of a mixture of 10 to 50, preferably 20 to 35 wt. %, related to the mixture, of acrylonitrile or (meth)acrylic acid ester and 50 to 90, preferably 65 to 80 wt. %, related to the mixture, of styrene onto II. 30 to 90, preferably 50 to 85, in particular 60 to 80 wt. %, related to the grafted product, of a butadiene polymer with at least 50 wt. %, related to IL butadiene residues as the grafting backbone, wherein the gel content of the grafting backbone II is at least 70 wt. % (measured in toluene), the degree of grafting G of the graft polymer C) is 0.15 to 0.55 and its average particle diameter $d_{50}$ 0.05 to 2, preferably 0.1 to 0.6 μm.

(Meth) acrylic acid esters I are esters of acrylic acid or methacrylic acid and monohydric alcohols with 1 to 18 C atoms. Methyl, ethyl and propyl methacrylate and particularly preferred.

In addition to butadiene residues, the grafting backbone II may contain up to 50 wt. %, related to II, of residues of other ethylenically unsaturated monomers, such as styrene, acrylonitrile, esters of acrylic or methacrylic acid with 1 to 4 C atoms in the alcohol component (such as methyl acrylate, ethyl acrylate, methyl methacrylate, ethyl methacrylate), vinyl esters and/or vinyl ethers. The preferred grafting backbone II consists of pure polybutadiene.

Since, as is known, the graft monomers are not necessarily entirely grafted onto the grafting backbone, graft polymers C) according to the invention are also taken to be those products obtained by polymerisation of the graft monomers in the presence of the grafting backbone.

The degree of grafting G describes the ratio by weight of grafted monomers to the grafting backbone and is dimensionless.

The average particle size $d_{50}$ is the diameter both above and below which are found 50 wt. % of the particles. This value may be determined by ultracentrifuge measurements (W. Scholtan, H. Lange, *Kolloid Z. & Z. Polymere* 250 (1972), 782–796).

Particularly preferred graft polymers C) are also, for example, graft polymers of (a) 20 to 90 wt. %, related to C), of acrylate rubber with a glass transition temperature of below −20° C. as the grafting backbone and (b) 10 to 80 wt. %, related to C), of at least one polymerisable, ethylenically unsaturated monomer, the homo- or copolymers of which, if formed in the absence of a), would have a glass transition temperature of above 25° C., as the graft monomers.

The acrylate rubbers (a) of the polymers C) are preferably polymers of acrylic acid alkyl esters, optionally with up to 40 wt. %, related to (a), of other polymerisable, ethylenically unsaturated monomers. Preferred polymerisable acrylic acid esters include $C_1$–$C_8$ alkyl esters, for example methyl, ethyl, n-butyl, n-octyl and 2-ethylhexyl acrylate; halogenalkyl esters, preferably halogen-$C_1$–$C_8$-alkyl esters, such as chloroethyl acrylate, together with mixtures of these monomers.

To achieve crosslinking, monomers with more than one polymerisable double bond may be copolymerised. Preferred examples of crosslinking monomers are esters of unsaturated monocarboxylic acids with 3 to 8 C atoms and unsaturated monohydric alcohols with 3 to 12 C atoms or saturated polyols with 2 to 4 OH groups and 2 to 20 C atoms, such as for example ethylene glycol dimethacrylate, allyl methacrylate; polyunsaturated heterocyclic compounds, such as for example trivinyl and triallyl cyanurate; polyfunctional vinyl compounds, such as di- and trivinylbenzenes; but also triallyl phosphate and diallyl phthalate.

Preferred crosslinking monomers are allyl methacrylate, ethylene glycol dimethylacrylate, diallyl phthalate and heterocyclic compounds containing at least 3 ethylenically unsaturated groups.

Particularly preferred crosslinking monomers are the cyclic monomers triallyl cyanurate, triallyl isocyanurate, trivinyl cyanurate, triacryloylhexahydro-s-triazine, triallylbenzenes.

The quantity of crosslinking monomers is preferably 0.02 to 5, in particular 0.05 to 2 wt. %, related to the grafting backbone (a).

In the case of cyclic crosslinking monomers with at least 3 ethylenically unsaturated groups, it is advantageous to limit the quantity of below 1 wt. % of the grafting backbone (a).

Other than the acrylic acid esters, preferred polymerisable, ethylenically unsaturated monomers which may optionally be used to produce the grafting backbone (a) are, for example, acrylonitrile, styrene, α-methylstyrene, acrylamides, vinyl-$C_1$–$C_6$ -alkyl ethers, methyl methacrylate, butadiene. Preferred acrylate rubbers as the grafting backbone (a) are emulsion polymers having a gel content of at least 60 wt. %.

Further suitable grafting backbones are silicone rubbers with active grafting sites, as are described in DE-OS 37 04 657, DE-OS 37 04 655, DE-OS 36 31 540 and DE-OS 36 31 539.

The gel content of the grafting backbone (a) is determined in dimethylformamide at 25° C. (M. Hoffmann, H. Krömer, R. Kuhn, *Polymeranalytik I & II,* Georg Thieme Verlag, Stuttgart 1977).

The aqueous dispersions of graft polymer C) to be used for the preferred embodiment of coprecipitation with the tetrafluoroethylene polymer E) generally have solids contents of 25 to 60, preferably 30 to 45 wt. %.

COMPONENT D

The polymer blends according to the invention contain as flame retardant a mixture of a monophosphorus compound D.1) and a oligomeric phosphorus compound D.2). Component D.1) is a phosphorus compound according to the formula (I)

(I)

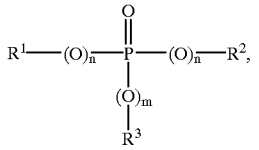

in which formula, $R^1$, $R^2$ and $R^3$ mutually independently mean optionally halogenated $C_1$–$C_8$ alkyl, $C_6$–$C_{20}$ aryl or $C_7$–$C_{12}$ aralkyl m means 0 or 1 and n means 0 or 1.

The phosphorus compounds according to component D.1) which are suitable according to the invention are generally known (see, for example, *Ullmanns Enzyklopaädie der technischen Chemie,* vol. 18, p. 301 et seq. 1979; Houben-Weyl, *Methoden der Organischen Chemie,* Vol. 12/1, p. 43; Beilstein, vol. 6, p. 177). Preferred substituents $R^m$ to $R^s$ comprise methyl, butyl, octyl, chloroethyl, 2-chloropropyl, 2,3-dibromopropyl, phenyl, cresyl, cumyl, naphthyl, chlorophenyl, bromophenyl, pentachlorophenyl and pentabromophenyl. Methyl, ethyl, butyl, phenyl, the latter optionally substituted with methyl, ethyl, chlorine and/or bromine, are particularly preferred.

Preferred phosphorus compounds D.1) (formula (I)) comprise, for example, tributyl phosphate, tris-(2-chloroethyl) phosphate, tris-(2,3-dibromopropyl) phosphate, triphenyl phosphate, tricresyl phosphate, diphenylcresyl phosphate, diphenyloctyl phosphate, diphenyl-2-ethylcresyl phosphate, tri-(isopropylphenyl) phosphate, halogen-substituted aryl phosphates, methylphosphonic acid dimethyl ester, methylphosphonic acid diphenyl ester, phenylphosphonic acid diethyl ester, triphenylphosphine oxide and tricresylphosphine oxide.

Component D.2) is an oligomeric phosphorus compound of the formula (II).

(II)

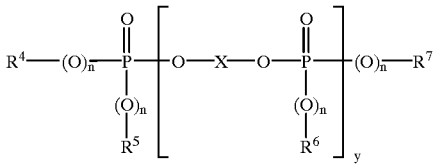

In the formula, $R^4$, $R^5$, $R^6$, $R^7$ mutually independently mean $C_1$–$C_8$ alkyl, $C_5$–$C_6$ cycloalkyl, $C_6$–$C_{10}$ aryl or $C_7$–$C_{12}$ aralkyl, $C_6$–$C_{10}$ aryl or $C_7$–$C_{12}$ aralkyl being preferred. The aromatic groups $R^4$, $R^5$, $R^6$, $R^7$ may in themselves be substituted with halogen or alkyl groups. Particularly preferred aryl residues are cresyl, phenyl, xylenyl, propylphenyl or butylphenyl, together with the brominated and chlorinated derivatives thereof.

X in the formula (II) means a mono- or polycyclic aromatic residue with 6 to 30 C atoms. This residue is derived from diphenols such as, for example, bisphenol A, resorcinol or hydroquinone or also the chlorinated or brominated derivatives thereof.

The values of n in the formula (II) may mutually independently be 0 or 1, n preferably equalling 1.

y may have values between 1 and 5, preferably between 1 and 2. Mixtures of various oligomeric phosphates may also be used as component D.2) according to the invention. In this case, y has an average value between 1 and 5, preferably between 1 and 2.

The polymer blends according to the invention contain as flame retardant a mixture of D. 1) and D.2). The weight ratios of D.1) and D.2) have to be chosen in such a manner to achieve a synergistic effect. The mixture generally consists of 10 to 90 wt. % of D.1) and 90 to 10 wt. % of D.2) (related to D) in each case). Particularly favourable properties are achieved in the preferred and particularly preferred range of about 12 to 50 and 14 to 40 wt. % of D.1) and 88 to 50 wt. % and 86 to 60 wt. % of D.2). Very particul- arly preferred is the range of 15 to 40 wt. % of D.1) and 85 to 60 wt. % of D.2).

COMPONENT E

The fluorinated polyolefins E) are of high molecular weight and have glass transition temperatures of above −30° C., generally of about 100° C., fluorine contents preferably of 65 to 76, in particular of 70 to 76 wt. %, average particle diameters $d_{50}$ of 0.05 to 1000, preferably of 0.08 to 20 μm. In general, the fluorinated polyolefins E) have a density of 1.2 to 2.3 g/cm$^3$. Preferred fluorinated polyolefins E) are polytetrafluoroethylene, polyvinylidene fluoride, tetrafluoroethylene/hexafluoropropylene and ethylene/tetrafluoroethylene copolymers. The fluorinated polyolefins and know (c.f. *Vinyl and Related Polymers* by Schildknecht, John Wiley & Sons Inc., New York, 1962, p. 484–494; *Fluoropolymers* by Wall, Wiley-Interscience, John Wiley & Sons Inc., New York, vol. 13, 1970, p. 623–654; *Modern Plastics Encyclopedia,* 1970–1971, vol. 47, n° 10 A, October 1970, McGraw-Hill Inc., New York, p. 134 and 774; *Modern Plastics Encyclopedia,* 1975–1976, October 1975, vol. 52, n° 10 A, McGraw-Hill Inc., New York, p. 27, 28 & 472 and U.S. Pat. Nos. 3,671,487, 3,723,373 and 3,838,092).

These polymers may be produced using known processes, such as for example by polymerisation of tetrafluoroethylene in an aqueous medium with a free radical forming catalyst, for example sodium, potassium or ammonium peroxydisulphate at pressures of 7 to 71 kg/cm$^2$ and at temperatures of 0° to 200° C., preferably at temperatures of 20° to 100° C. (For further details, see for example U.S. Pat. No. 2,393, 967). Depending upon the form in which it is used, the density of these materials may be between 1.2 and 2.3 g/cm$^3$ and average particle sizes between 0.05 and 1000

Preferred fluorinated polyolefins E) according to the invention are tetrafluoroethylene polymers with average particle diameters of 0.05 to 20 μm, preferably of 0.08 to 10 μm, and a density of 1.2 to 1.9 g/cm$^3$, which are preferably used in the form of a coagulated mixture of emulsions of the tetrafluoroethylene polymers E) with emulsions of the graft polymers C).

Suitable fluorinated polyolefins E) which may be used in powder form are tetrafluoroethylene polymers with average particle sizes of 100 to 1000 μm and densities of 2.0 g/cm$^3$ to 2.3 g/cm$^3$.

In order to produce a coagulated mixture of C) and E), an aqueous emulsion (latex) of a graft polymer C) with an average latex particle diameter of 0.05 to 2 μm, in particular 0.1 to 0.6 μm, is first of all blended with a finely divided emulsion of a tetrafluoroethylene polymer E) in water with an average particle diameter of 0.05 to 20 μm, in particular 0.08 to 10 μm; suitable tetrafluoroethylene polymer emulsions customarily have solids contents of 30 to 70 wt. %, in particular 50 to 60 wt. %. The emulsions of the graft polymer C) have solids contents of 25 to 50 wt. %, preferably of 30 to 45 wt. %.

The stated quantity in the description of component C) excludes the proportion of the graft polymer for the coagulated mixture of graft polymer and fluorinated polyolefins.

In the emulsion mixture, the ratio by weight of graft polymer C) to the tetrafluoroethylene polymer E) is 95:5 to 60:40. The emulsion mixture is then coagulated in a known manner, for example by spray drying, freeze drying or coagulation by adding inorganic or organic salts, acids, bases or organic, water-miscible solvents such as alcohols, ketones, preferably at temperatures of 20° to 150° C., in particular of 50° to 100° C. If necessary, drying may be performed at 50° to 200° C, preferably 70° to 100° C.

Suitable tetrafluoroethylene polymer emulsions are customary commercial products offered for sale, for example, by the company DuPont as Teflone® 30N.

The moulding compounds according to the invention may contain customary additives such as lubricants and mould release agents, nucleating agents, antistatic agents, stabilisers, fillers and reinforcing materials, together with dyes and pigments. The filled or reinforced moulding compounds may contain up to 60, preferably 10 to 40 wt. %, related to the filled or reinforced moulding compound, of fillers and/or reinforcing materials. Glass fibre is the preferred reinforcing material. Preferred fillers, which may also have a reinforcing effect, are glass beads, mica, silicates, quartz, talcum, titanium dioxide, wollastonite.

The moulding compounds according to the invention consisting of components A to E and optionally further known additives such as stabilisers, dyes, pigments, lubricants and mould release agents, fillers and reinforcing materials, nucleating agents together with antistatic agents are produced by mixing together the particular constituents in a known manner and melt-compounding or melt-extruding them at temperatures of 200° C. to 330° C. in customary equipment, such as internal kneaders, extruders and double screw extruders, wherein component E) is preferably used in the form of the already mentioned coagulated mixture.

The present invention thus also provides a process for the production of thermoplastic moulding compounds consisting of components A to E, optionally together with stabilisers, dyes, pigments, lubricants and mould release agents, fillers and reinforcing materials, nucleating agents, together with antistatic agents, which is characterised in that, once components A to E, optionally together with stabilisers, dyes, pigments, plasticisers, fillers and reinforcing materials, lubricants and mould release agents, nucleating agents and/or antistatic agents are mixed together, they are melt-compounded or melt-extruded in customary equipment at temperatures of 200° to 330°, wherein component E is preferably used in the form of a coagulated mixture with component C. The individual constituents may be mixed together in a known manner both consecutively and simultaneously, and both at approximately 20° C. (room temperature) and at higher temperatures.

The moulding compounds according to the present invention may be used to produce mouldings of any kind. In particular, mouldings may be produced by injection moulding. Examples of articles which may be moulded are: casing parts of any kind, for example for household appliances such as juice extractors, coffee machines, food mixers, for office equipment or cover plates for the construction sector and motor vehicle components. The moulding compounds are also used in electrical engineering because they have very good electrical properties.

The moulding compounds are particularly suitable for the production of thin-walled mouldings (for example computer casing parts), which are required to exhibit particularly high notched impact strength and stress cracking resistance.

Another type of processing is the production of mouldings by blowmoulding or by thermaforming previously produced sheet or film.

EXAMPLES

Component A

Bisphenol A based polycarbonate with a relative solution viscosity of 1.26 to 1.28 measured in methylene chloride at 25° C. at a concentration of 0.5 g/100 ml.

Component B

Styrene/acrylonitrile copolymer with a stryene/acrylonitrile ratio of 72:28 and an intrinsic viscosity of 55 dl/g (measured in dimethylformamide at 20° C).

Component C

Graft polymer of 45 parts by weight of styrene and acrylonitrile in a ratio of 72:28 on 55 parts by weight of particulate, crosslinked polybutadiene rubber (average particle diameter $d_{50}$=0.4 $\mu$m), produced by emulsion polymerisation.

Component D

D.1) triphenyl phosphate (Disflamoll® TP from Bayer AG) D.2) m-phenylene-bis(diphenylphosphate) (Fyroflex RDP from Akzo)

Component E

Tetrafluoroethylene polymer as a coagulated mixture prepared from an aqueous emulsion of SAN graft polymer according to C) and an aqueous emulsion of tetrafluoroethylene polymer. The ratio by weight of the graft polymer C) to the tetrafluoroethylene polymer E) in the mixture is 90 wt. % to 10 wt. %. The tetrafluoroethylene polymer emulsion has a solids content of 60 wt. % and average particle diameter is between 0.05 and 0.5 $\mu$m. The SAN graft polymer emulsion has a solids content of 34 wt. % and an average latex particle diameter of 0.4 $\mu$m.

PRODUCTION OF E

The emulsion of the tetrafluoroethylene polymer (Teflon 30 N from DuPont) is blended with the SAN graft polymer emulsion C) and stabilised with 1.8 wt. %, related to polymer solids, of phenolic antioxidants. At 85° to 95° C., the mixture is coagulated with an aqueous solution of $MgSO_4$ (Epsom salts) and acetic acid at pH 4 to 5, filtered and washed until virtually free of electrolytes, the majority of the water is then eliminated by centrifugation and the product dried at 100° C. to give a powder. This powder may then be compounded with the other components in the described equipment.

Production and Testing of Moulding Compounds According to the Invention

Components A to E were mixed together in a 3-1 internal kneader. The mouldings were produced on an Arburg 270 E injection moulding machine at 260° C.

Stress cracking behaviour was determined on bars of dimensions 80×10×4 mm, melt temperature 260° C. The test medium was a mixture of 60 vol. % toluene and 40 vol. % isopropanol. The test pieces were pre-stressed on a circular arc template (elongation 2.4%) and stored in the test medium at room temperature. Stress cracking behaviour was determined by assessing cracking or failure as a function of length of exposure to the test medium.

The composition of the tested materials and the results obtained are summarised in the following table.

It may be seen from the table that the comparative examples 1 and 8 with pure component D.2) and D.1) respectively have distinctly lower stress cracking resistance than examples 2 to 7 according to the invention.

TABLE

Composition and propeties of moulding compounds

| | Components [parts by weight] | | | | | | Failure at $\epsilon_x$ = 2.4% |
|---|---|---|---|---|---|---|---|
| Example | A | B | C | D.1 | D.2 | E | [minutes] |
| 1 (comparison) | 67 | 10 | 7.5 | — | 10 | 3.5 | 3.4 |
| 2 | 67 | 10 | 7.5 | 1 | 9 | 3.5 | 3.5 |
| 3 | 67 | 10 | 7.5 | 1.5 | 8.5 | 3.5 | 4.7 |
| 4 | 67 | 10 | 7.5 | 2 | 8 | 3.5 | 5.6 |
| 5 | 67 | 10 | 7.5 | 3 | 7 | 3.5 | 4.7 |
| 6 | 67 | 10 | 7.5 | 4 | 6 | 3.5 | 4.3 |
| 7 | 67 | 10 | 7.5 | 5 | 5 | 3.5 | 3.4 |
| 8 (comparison) | 67 | 10 | 7.5 | 10 | — | 3.5 | 2.5 |

We claim:

1. Flame resistant, thermoplastic moulding compounds containing

A) 40 to 98 parts by weight of an aromatic polycarbonate;

B) 3 to 50 parts by weight of a vinyl copolymer prepared from

B.1) 50 to 98 parts by weight of styrene, α-methylstyrene, ring-substituted styrenes, $C_1$–$C_8$ alkyl methacrylates, $C_1$–$C_8$ alkyl acrylates or mixtures thereof and B.2) 50 to 2 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof;

C) 0.5 to 40 parts by weight of a graft polymer prepared from

C.1) 5 to 95 parts by weight of a mixture of

C.1.1) 50 to 95 parts by weight of styrene, α-methylstyrene, halogen or methyl ring-substituted styrene, $C_1$–$C_8$ alkyl methacrylate, $C_1$–$C_8$ alkyl acrylate, or mixtures of these compounds and C.1.2) 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl or phenyl N-substituted maleimides or mixtures of these compounds on C.2) 5 to 95 parts by weight of a polymer with a glass transition temperature of below −10° C.

D) 0.5 to 20 parts by weight of a mixture of

D.1) 14 to 40 wt. %, related to D), of a monophosphorus compound of the formula (I)

(I)

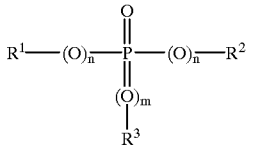

in which $R^1$, $R^2$ and $R^3$ are independently phenyl, cresyl, cumyl, naphthyl, chlorophenyl, bromophenyl, pentachlorophenyl or pentabromophenyl n means 1 and D.2) 86 to 60 wt. %, related to D), of an oligomeric phosphorus compound of the formula (II)

(II)

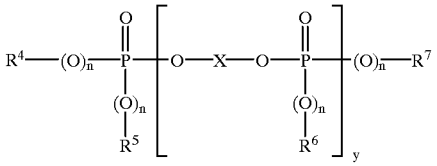

in which $R^4$, $R^5$, $R^6$, $R^7$ are independently cresyl, phenyl xylenyl , propylphenyl or butylphenyl, or brominated or chlorinated derivatives thereof, n means 1, y has an average value of between 1 and 2, and x means a residue derived from resorcinol or hydroquinone, and E) 0.05 to 5 parts by weight of a fluorinated polyolefin with an average particle diameter of 0.05 to 1000 $\mu$m, a density of 1.2 to 2.3 g/cm$^3$ and a fluorine content of 65 to 76 wt. %.

2. Moulding compounds according to claim 1, containing 50 to 95 parts by weight of an aromatic polycarbonate A.

3. Moulding compounds as according to claim 1 containing component D) in amounts of monophosphorus compound D.1) and an oligomeric phosphorus compound D.2) in combined amounts effective to improve stress cracking resistance.

4. Flame resistant thermoplastic moulding compound according to claim 1 containing additives selected from the group consisting of stabilizers, dyes, pigments, lubricants and mold release agents, fillers and reinforcing materials, nucleating agents and antistatic agents.

5. The flame resistant, thermoplastic molding compound of claim 1, wherein in component D.2. each of $R^4$, $R^5$, $R^6$ and $R^7$ are phenyl.

6. A flame resistant thermoplastic molding compound having improved stress resistance, consisting essentially of:

A) 40–98 parts by weight of aromatic polycarbonate;

B) 3–50 parts by weight of styrene/acrylonitrile copolymer;

C) 0.5 to 40 parts by weight of a graft polymer of styrene and acrylonitrile on particulate, crosslinked polybutadiene rubber;

D) 0.5 to 20 parts by weight of a mixture of:

D.1.) 14 to 40%, based on D), of triphenyl phosphate;

D.2.) 86 to 60%, based on D), of m-phenylene-bis (diphenylphosphate); and

E) 0.05 to 5 parts by weight of tetrafluoroethylene polymer.

7. The molding compound of claim 6 containing 50 to 95 parts of A), 5 to 40 parts of B), 2 to 12 parts of C), 2 to 15 parts of D), and 0.1 to 0.5 parts of E).

8. The molding compound of claim 7, containing 67 parts of A), 10 parts of B), 7.5 parts of C), and 3.5 parts of E).

9. Flame resistant, thermoplastic moulding compounds containing

A) 40 to 98 parts by weight of an aromatic polycarbonate;

B) 3 to 50 parts by weight of a vinyl copolymer prepared from

B.1) 50 to 98 parts by weight of styrene, $\alpha$-methylstyrene, ring-substituted styrenes, $C_1$–$C_8$ alkyl methacrylates, $C_1$–$C_8$ alkyl acrylates or mixtures thereof and B.2) 50 to 2 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof;

C) 0.5 to 40 parts by weight of a graft polymer prepared from

C.1) 5 to 95 parts by weight of a mixture of

C.1.1.) 50 to 95 parts by weight of styrene, $\alpha$-methylstyrene, halogen or methyl ring-substituted styrene, $C_1$–$C_8$ alkyl methacrylate $C_1$–$C_8$ alkyl acrylate, or mixtures of these compounds and C.1.2.) 5 to 50 parts by weight of acrylonitrile, methacrylonitrile, $C_1$–$C_8$ alkyl methacrylates $C_1$–$C_8$ alkyl acrylate, maleic anhydride, $C_1$–$C_4$ alkyl or phenyl N-substituted maleimides or mixtures of these compounds on C.2) 5 to 95 parts by weight of a polymer with a glass transition temperature of below −10° C.

D) 0.5 to 20 parts by weight of a mixture of

D.1) 10 to 90 wt. %, related to D), of a monophosphorus compound of the formula (I)

(I)

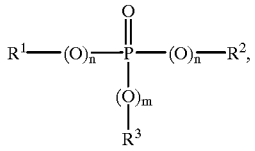

in which $R^1$, $R^2$ and $R^3$ mutually independently mean optionally halogenated $C_1$–$C_8$ alkyl, $C_6$–$C_{20}$ aryl or $C_7$–$C_{12}$ aralkyl n means 1 and D.2) 90 to 10 wt. %, related to D), of an oligomeric phosphorus compound of the formula (II)

(II)

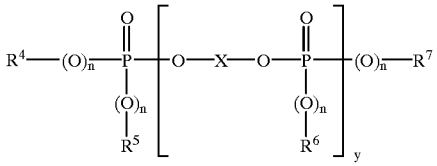

in which $R^4$, $R^5$, $R^6$, $R^7$ are mutually independently cresyl, phenyl, xylenyl, propylphenyl or butylphenyl, or brominated or chlorinated derivatives thereof n means 1, Y means an average value of between 1 and 2, and X means a residue derived from resorcinol or hydroquinone, and E) 0.05 to 5 parts by weight of a fluorinated polyolefin with an average particle diameter of 0.05 to 1000 μm, a density of 1.2 to 2.3 g/cm$^3$ and a fluorine content of 65 to 76 wt. %.

10. The moulding compound of claim 9, wherein component C) is one or more of polybutadiene, butadiene styrene copolymer, acrylate rubber, polyisobutadiene, or polyisoprene.

11. The moulding composition of claim 9, wherein component C) is polybutadiene, butadiene/styrene copolymer, or mixtures thereof.

*12. Flame resistant, thermoplastic moulding compounds containing*

*A) 40 to 98 parts by weight of an aromatic polycarbonate;*

*B) 3 to 50 parts by weight of a vinyl copolymer prepared from*

*B.1) 50 to 98 parts by weight of styrene, α-methylstyrene, ring-substituted styrenes, $C_1$–$C_8$ alkyl methacrylates, $C_1$–$C_8$ alkyl acrylates or mixtures thereof and*

*B.2) 50 to 2 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof;*

*C) 0.5 to 40 parts by weight of a graft polymer prepared from*

*C.1) 5 to 95 parts by weight of a mixture of*

*C.1.1) 50 to 95 parts by weight of styrene, α-methylstyrene, halogen or methyl ring-substituted styrene, $C_1$–$C_8$ alkyl methacrylate, $C_1$–$C_8$ alkyl acrylate, or mixtures of these compounds and*

*C.1.2) 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl alkyl or phenyl N-substituted maleimides or mixtures of these compounds on*

*C.2) 5 to 95 parts by weight of a polymer with a glass transition temperature of below −10° C.,*

*D) 0.5 to 20 parts by weight of a mixture of*

*D.1) 10 to 90 wt. %, related to D), of a monophosphorus compound of the formula (I)*

(I)

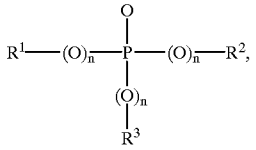

*in which*

*$R^1$, $R^2$ and $R^3$ mutually independently mean optionally halogenated $C_1$–$C_8$ alkyl, $C_6$–$C_{20}$ aryl or $C_7$–$C_{12}$ aralkyl*

*n means 1 and*

*D.2) 90 to 10 wt. %, related to D), of an oligomeric phosphorus compound of the formula (II)*

(II)

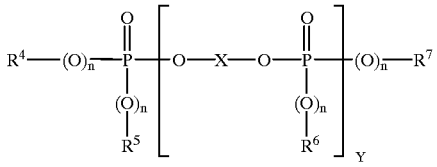

*in which*

*$R^4$, $R^5$, $R^6$, $R^7$ are mutually independently cresyl, phenyl, xylenyl, propylphenyl or butylphenyl, or brominated or chlorinated derivatives thereof*

*n means 1,*

*y means an average value between 1 and 2, and*

*x means a residue derived from bisphenol A, rescorcinol or hydroquinone, and*

*E) 0.05 to 5 parts by weight of a fluorinated polyolefin with an average particle diameter of 0.05 to 1000 μm, a density of 1.2 to 2.3 g/cm$^3$ and a fluorine content of 65 to 76 wt. %.*

*13. Flame resistant, thermoplastic moulding compounds containing*

*A) 40 to 98 parts by weight of an aromatic polycarbonate;*

*B) 3 to 50 parts by weight of a vinyl copolymer prepared from*

*B.1) 50 to 98 parts by weight of styrene, α-methylstyrene, ring-substituted styrenes, $C_1$–$C_8$ alkyl methacrylates, $C_1$–$C_8$ alkyl acrylates or mixtures thereof and*

*B.2) 50 to 2 parts by weight of acrylonitrile, methacrylonitrile, $C_1$–$C_8$ alkyl methacrylates, $C_1$–$C_8$ alkyl acrylates, maleic anhydride, N-substituted maleimides and mixtures thereof;*

*C) 0.5 to 40 parts by weight of a graft polymer prepared from*

*C.1) 5 to 95 parts by weight of a mixture of*

*C.1.1) 50 to 95 parts by weight of styrene, α-methylstyrene, halogen or methyl ring-substituted styrene, $C_1$–$C_8$ alkyl methacrylate, $C_1$–$C_8$ alkyl acrylate, or mixtures of these compounds and*

*C.1.2) 5 to 50 parts by weight of acrylonitrile, methacrylonitrile, $C_1$–$C_8$ alkyl methacrylates, $C_1$–$C_8$ alkyl acrylate, maleic anhydride, $C_1$–$C_4$ alkyl or phenyl N-substituted maleimides or mixtures of these compounds on*

*C.2) 5 to 95 parts by weight of a polymer with a glass transition temperature of below −10° C.,*

*D) 0.5 to 20 parts by weight of a mixture of*

*D.1) 14 to 40 wt. %, related to D), of a monophosphorus compound of the formula (I)*

(I)

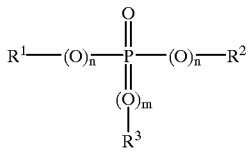

*in which*

*$R^1$, $R^2$ and $R^3$ are independently phenyl, cresyl, cumyl, naphthyl, chlorophenyl, bromophenyl, pentachlorophenyl or pentabromophenyl*

*n means 1 and*

*D.2) 86 to 60 wt. %, related to D), of an oligomeric phosphorus compound of the formula (II)*

(II)

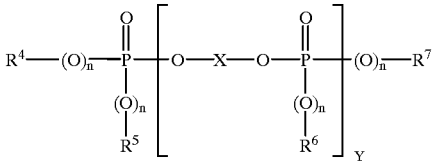

*in which*

$R^4$, $R^5$, $R^6$, $R^7$ *are independently cresyl, phenyl, xylenyl, propylphenyl or butylphenyl, or brominated or chlorinated derivatives thereof,*

*n means 1,*

*y has an average value between 1 and 2, and*

*x means a residue derived from bisphenol A, rescorcinol or hydroquinone, and*

*E) 0.05 to 5 parts by weight of a fluorinated polyolefin with an average particle diameter of 0.05 to 1000 μm, a density of 1.2 to 2.3 g/cm$^3$ and a fluorine content of 65 to 76 wt. %.*

* * * * *